United States Patent
Budge

(10) Patent No.: US 6,237,879 B1
(45) Date of Patent: May 29, 2001

(54) ERGONOMIC COMFORT PADS FOR PORTABLE OR NOTEBOOK COMPUTERS

(76) Inventor: Michael Budge, 2124 N. Cahuenga Blvd., Los Angeles, CA (US) 90068

( * ) Notice: Subject to any disclaimer, the term of this patent is extended or adjusted under 35 U.S.C. 154(b) by 0 days.

(21) Appl. No.: 09/587,936

(22) Filed: Jun. 6, 2000

Related U.S. Application Data

(63) Continuation-in-part of application No. 09/394,193, filed on Sep. 10, 1999, now abandoned.

(51) Int. Cl.[7] .......................................................... B68G 5/00
(52) U.S. Cl. ............................................. 248/118; 248/918
(58) Field of Search .................................... 248/923, 924, 248/118, 118.1, 918, 346.01, 118.3, 118.5; 340/700; 400/715

(56) References Cited

U.S. PATENT DOCUMENTS

| | | |
|---|---|---|
| 5,122,786 | 6/1992 | Rader . |
| 5,175,672 * | 12/1992 | Conner .................................. 248/923 |
| 5,217,781 | 6/1993 | Kuipers . |
| 5,348,408 | 9/1994 | Gelardi et al. . |
| 5,358,766 | 10/1994 | Field . |
| 5,481,265 | 1/1996 | Russell . |
| 5,508,084 | 4/1996 | Reeves et al. . |
| 5,575,578 | 11/1996 | Lakoski et al. . |
| 5,596,481 | 1/1997 | Liu et al. . |
| 5,667,320 | 9/1997 | Ambrose et al. . |
| 5,678,266 * | 10/1997 | Petringa . |
| 5,686,005 | 11/1997 | Wright, Sr. . |
| 5,732,910 | 3/1998 | Martin . |
| 5,765,795 | 6/1998 | Alex . |
| 5,776,585 | 7/1998 | Fukuhara et al. . |
| 5,788,203 | 8/1998 | Nitti . |
| 5,803,416 | 9/1998 | Hanson et al. . |
| 5,820,968 | 10/1998 | Kurani . |
| 5,825,612 | 10/1998 | Aubuchon et al. . |
| 5,876,362 | 3/1999 | Root . |

* cited by examiner

Primary Examiner—Alvin Chin-Shue
(74) Attorney, Agent, or Firm—William W. Haefliger

(57) ABSTRACT

A pair of wrist pads removably and adjustably attached adjacent to the keyboard of a portable computer to aid in the comfort of a user.

9 Claims, 2 Drawing Sheets

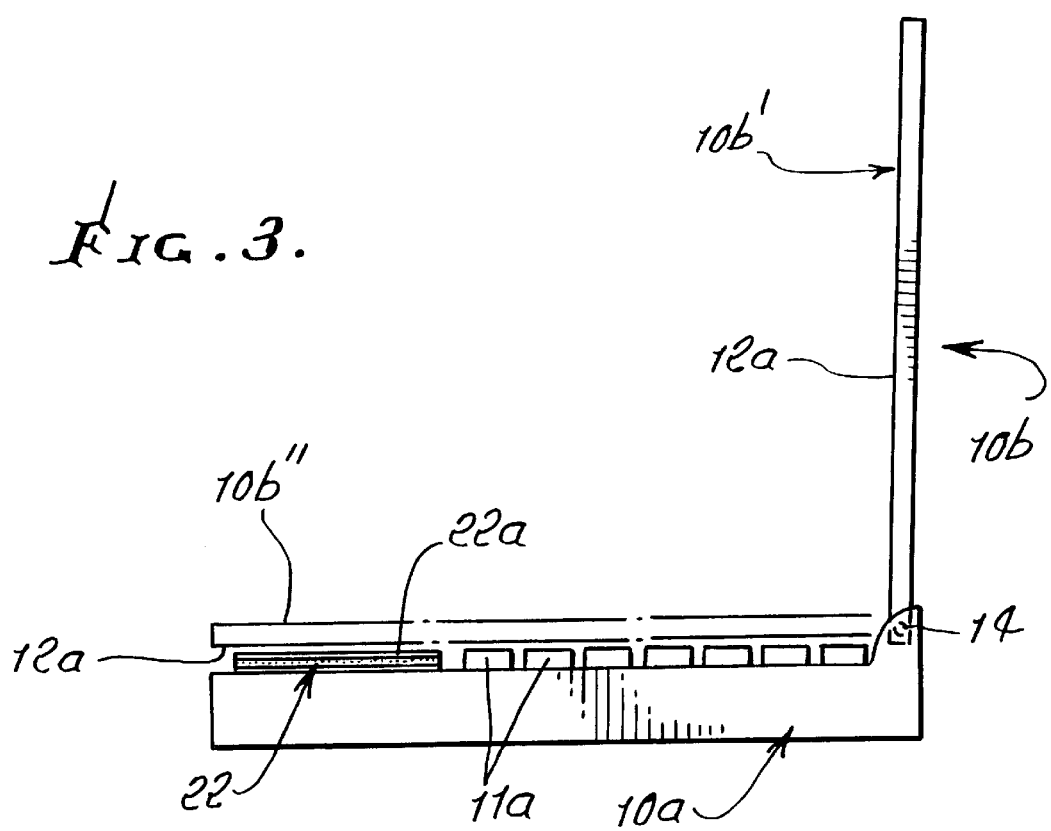
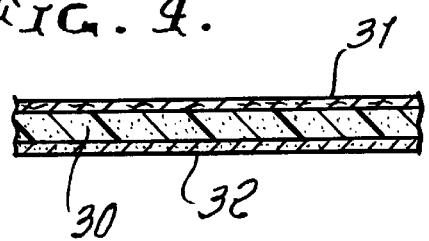
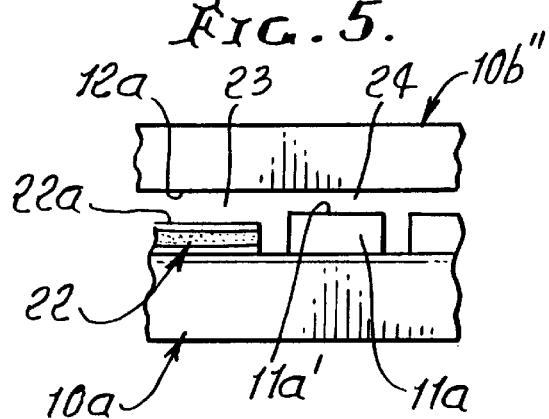
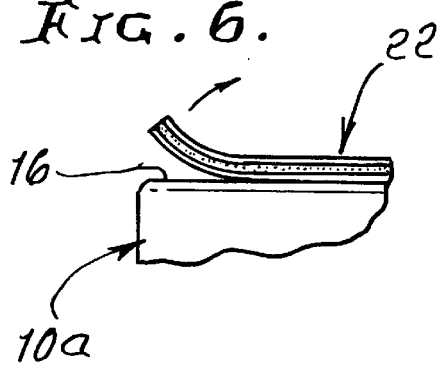
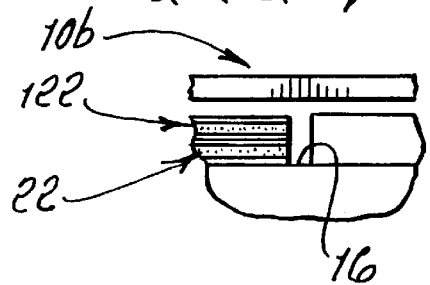

ERGONOMIC COMFORT PADS FOR PORTABLE OR NOTEBOOK COMPUTERS

This application is a continuation-in-part of Ser. No. 09/394,193, filed Sep. 10, 1999 abandoned.

BACKGROUND OF THE INVENTION

This invention relates generally to alleviation of manual discomfort arising from use of computer such as a portable, laptop type computer; and more particularly to provision of two hand, wrist or palm support pads which are spaced apart and positioned to extend directly beneath the normal position of the hands, wrists or palms of the operator of the computer, to yield the normal feel of the solid surface computer, yet also provide cushioning for comfort, and protect on against static electricity build-up, and heat expulsion from the computer body in contact with the user's hand, or hands.

The use of and advantages associates with portable computers are well known in the art. Over the last decade, there has been an intense effort in the computer industry to down size the personal computer to provide users with a powerful yet portable computer that can be taken out of the office and fully utilized at home or on the road. As advancements have been made in both microprocessing chip and battery technologies, particularly over the last decade, personal computers were eventually downsized into "laptop computers".

While these computers offered the portability and processing power of a full sized personal computer, the laptop was still somewhat large and heavy for the user to carry around. In response to these disadvantages, the laptops were downsized even further into what is now commonly known in the industry as a notebook computer, which is smaller and more light weight yet possessing equal or greater processing capabilities than their earlier laptop counterpart.

Because of their portability, notebook computers are frequently used in many applications for many different forms of industry and commerce. Due to their increased power and processing capabilities, these machines operate with greater levels of static electricity and heat expulsion. These "wasten" products of this modern technology can cause discomfort to the user at any given time. If an operator uses a notebook or portable computer computer for an extended period of time, he or she may experience hand discomfort and particularly the palms of the hands from such residual "waste" products. Therefore, need exists to develop a more effective means to counteract these adverse affects.

SUMMARY OF THE INVENTION

It is a major object of the invention to provide improved support pads positioned and individually adjusted on a computer to alleviate or eliminate the problems referred to. Basically, the invention provides for a combination that includes a computer having a first section supporting a keyboard and a second section supporting a screen, the second section pivotally connected to pivot between upright raised position, and a down pivoted position, with the second section then overlying the first section and keyboard, the improvement comprising a) the base section having two laterally spaced upward facing surfaces offset from the keyboard, b) the flat support pads respectively adhered or attached to said two spaced surfaces, in adjusted positions and openly spaced below the second section in down pivoted position thereof, so as not to interfere with such down pivoting to closed position, c) the pads consisting essentially of elastomeric foam material, and being relatively thin, d) the pads sized to comfortably support the computer user's wrists during stroking of the keyboard, when the second section is in raised position.

As will be seen the pads may have undersides adhesively attached to such surfaces; each pad preferably and typically has thickness between $\frac{1}{32}$ inch and $\frac{3}{16}$ inch throughout the area of the pad; and each pad typically has a looping edge bounding the pad area which is between 1 square inch and 4 square inches. This allows pad adjustment or positioning to a selected zone or zones under the user's wrists or palms.

A further object includes provision of such pads that are everywhere at levels below a plane defined by the uppermost levels of keyboard keys, whereby the pads do not interfere with closing of the laptop.

Yet another object includes provision of each such pad to consist of i) an intermediate layer of neoprene foam ii) an upper nylon layer attached to that intermediate layer, the upper layer having less than half the thickness of the intermediate layer, iii) an under layer of adhesive material for adhesively attaching the pad to one of the base section upward facing surfaces, and allowing pad pull off and re-positioning.

A further object includes optional provision of a third support pad adhered in superposed stacked relation to the upper surface of one of such two pads, whereby the combined height of the stacked pads provides more cushioning, as well as elevating the user's wrist and hand to a selected level affording greater finger accommodation to the keyboard, and provision of a fourth such support pad adhesive in superposed stacked relation to the upper surface of the other of said two support pads.

An added object includes provision of use of such pads through their selective adhering to the computer base section, whereby the pads being approximately of wrist width, and as selectively and locally positioned, serve to orient the user's hands or wrists to correct positions relative to the keyboard, and with comfort. Also, the slippery-ness of the pad upper surface or surfaces allows the user's hand surfaces in contact with the pads to easily slide on such surfaces during computer keyboard use, while the pad provides cushioning directly below that slippery or low friction upper surface.

Yet another object includes a method of use of such pads whereby they are selectively located at laterally adjustable distances, and relative to an intermediate control zone, to provide the advantages as referred to, and to orient the user's wrists.

The pads of the invention provide more comfort and shield protection from heat and static electricity generated by said notebook computers and are easily adapted to the computer geometry to help defend against such irritations. The pads are self-adhering, safe and easy to use and are removable, for individual and relative adjustment. They are sized to fit multiple brands and types of portable or notebook computers. The user receives benefits from the pads in an ergonomic manner, with comfort as during lengthy sessions at the computer.

These and other objects and advantages of the invention, as well as the details of an illustrative embodiment, will be more fully understood from the following specification and drawings, in which:

DRAWING DESCRIPTION

FIG. 3 is a left side view of the computer and pad combination, of FIG. 2;

FIG. 4 is an enlarged fragmentary section taken on lines 4—4 of FIG. 1;

FIG. 5 is an enlarged fragmentary section showing relative heights of an installed pad and keyboard keys;

FIG. 6 is an elevation showing peel-off removal of a pad, for subsequent adjustable positioning; and FIG. 7 is a view showing two staked superposed pads adhered to a computer base, proximate a keyboard.

DETAILED DESCRIPTION

Figure 2:
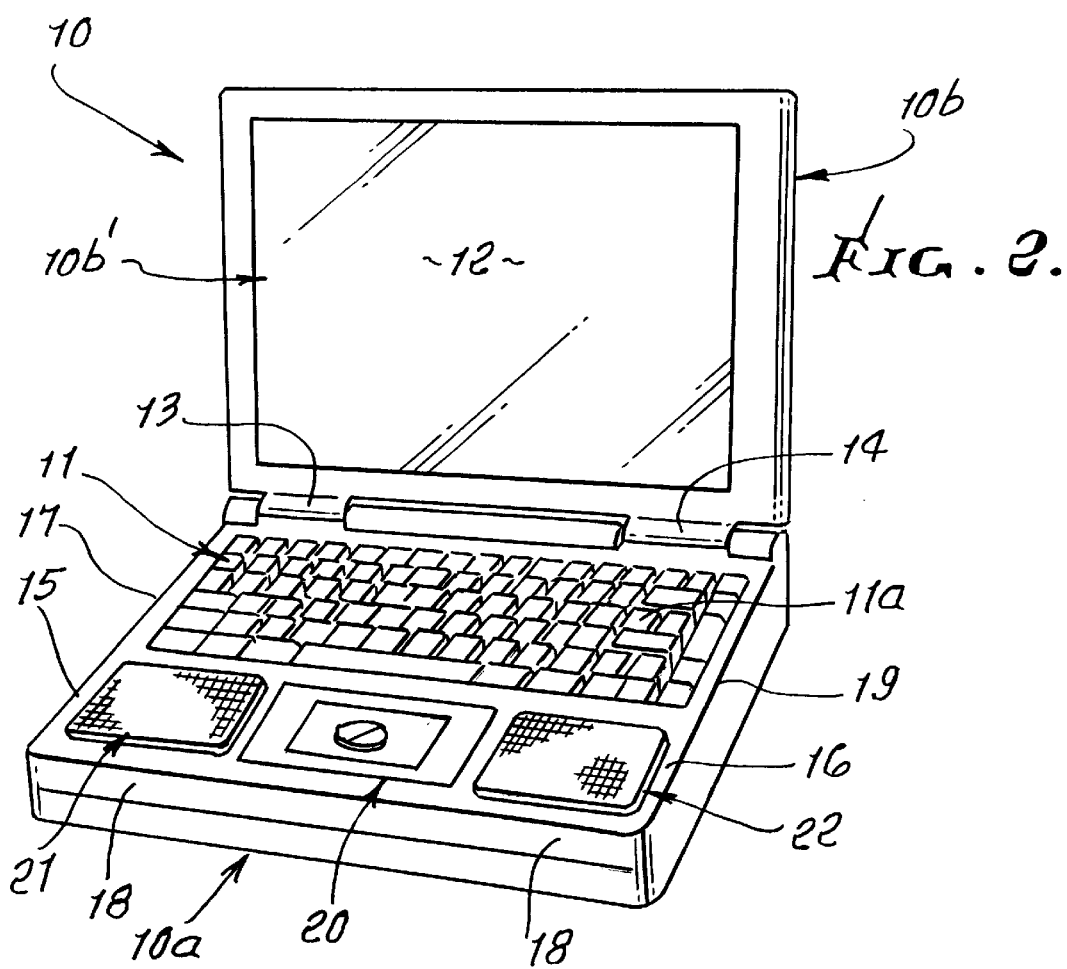
FIG. 2 is a perspective view of a laptop type computer, to which pads have been selectively applied.

As shown in FIGS. 2 and 3, a laptop computer 10 has a first or lower section 10a supporting a keyboard 11 having multiple keys 11a, as is known. A second or upper section 10b supports or carries a screen or display zone 12. The second section is pivotally connected to the first section, as at horizontal pivot locations 13 and 14, to pivot between upright raised position 10b' seen in FIGS. 2 and 3, and a down pivoted or closed (stored) position indicated by broken lines at 10b" in FIG. 3. In that position, section 10b overlies the first section 10a and the tops of the keys 11a.

It will be noted in FIG. 2 that the first or base section 10a has two laterally spaced upward facing surfaces 15 and 16. Surface 15 is located laterally and rightwardly inwardly from the left end 17 of the section 10a, and longitudinally and forwardly inwardly form the front end 18 of the section 10a. Likewise, surface 16 is located laterally and leftwardly inwardly from the right end 19 of section 10a, and longitudinally forwardly and inwardly form the front end 18 of section 10a. There is a computer control region 20 between surfaces 15 and 16, and separating those surfaces. During manual stroking of the keys 11a, the user's left hand or wrist overlies region 15, and the user's right hand 18 wrist overlies region 16. Surfaces 15 and 16 are also rearwardly offset form the keyboard.

In accordance with the invention, two flat support pads 21 and 22 are respectively attached, for example removably adhered, to the two spaced surfaces 15 And 16, in selected adjusted positions, and in such manner that the pads are openly spaced below the second section 10b in its down position, as is clear from FIGS. 3 and 5. See space 23 between the top level 22a of a pad 22 and the downfacing display side 12a of the down position 10b" of upper section 10b. Note also lesser space 24 between 12a and the top levels 11a' of the keyboard keys, in FIG. 5.

Figure 1:
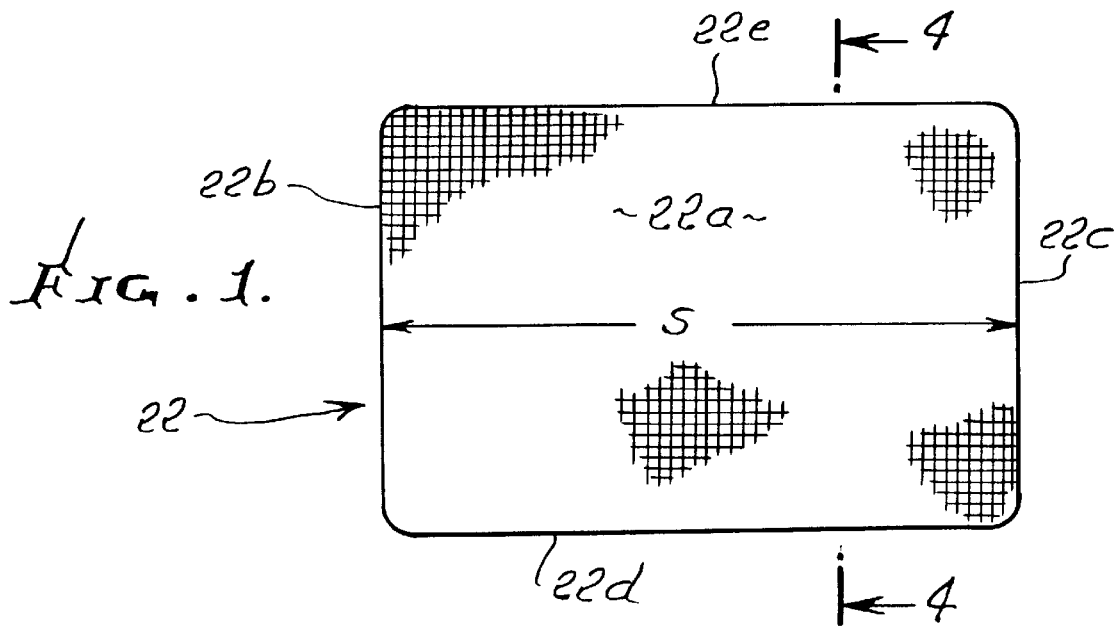
FIG. 1 is a plan view of a preferred pad in accordance with the invention.

The two pads 21 and 22 each consist essentially of elastomeric cushioning material, such as elastomeric foam, and are relatively thin. The pads have overall thickness between 1/32 and 3/16 inch, throughout the area of each pad, in order to provide the gap or space 23 referred to, and also to provide cushioning for the user's hand or wrist undersides, during key stroking use of the computer, over extended time periods. Also, each pad has a looping edge, which bounds the pad area, that area being between 1 square inch and 4 square inches. In the example shown in FIG. 1, the pad 22 is generally rectangular, and has two laterally spaced edges 22b and 22c each of about 2.5 inches length, and two longitudinally spaced edges 22d and 22e each of about 3.6 inches length. The lateral space or spacing S between edges 22b and 22c is of approximately wrist width, to widthwise and visually orient the user's hand in overlying position, and correctly relative to the keyboard, for correct address of that keyboard. The same is also true for pad 21, the two pads 21 and 22 being alike.

For best results, each pad preferably consists of:
 i) an intermediate layer of neoprene foam,
 ii) an upper nylon layer attached to the intermediate layer, the upper layer having less than half the thickness of the intermediate layer,
 iii) an under layer of adhesive material adhesively attaching the pad to one of the base section upward facing surfaces.

In FIG. 4, the intermediate layer is indicated at 30; the upper Nylon layer at 31; and the under layer at 32. Layers 31 and 32 are each substantially thinner than intermediate layer 30, to maximize cushioning provided by the overall thin pad. The upper layer 31, for example, has thickness between 1 mm and 2.3 mm, and is adhered to layer 30. Upper surface of layer 31 is relatively slippery to facilitate wrist shifting while pad supported. Lower adhesive layer 31 preferably removably but firmly attaches the pad 22 to surface 16. See FIG. 6 showing capability for forcible peel-off, in order to re-adjust the pad position on surface 16, i.e. closer to or further from each of edges 18 and 19. Such adjustability enables optimum pad positioning relative to the user's overlying wrist position, for addressing the keyboard. Layer 31 may consist of a wax paper with adhesive material on each of its opposite sides, to enable adhesion to layer 30, and also to surface 16.

FIG. 7 shows two such pads 22 and 122 adhesively stacked together in superposed relation, the lower pad 22 adhered to the computer surface 16, and the upper pad 122 underlying the computer section 10b in lowered position. Such an arrangement enhances cushioning.

The method of provision and use of the invention includes the steps:
 a) providing the computer first section to have two laterally spaced upward facing surfaces offset from the keyboard,
 b) providing two flat support pads respectively attached to those two spaced surfaces, and openly spaced below the computer second section in down pivoted position thereof,
 c) the pads consisting essentially of elastomeric foam material, and being relatively thin,
 d) the pads sized to support the computer user's wrists during stroking of the keyboard, when the second section is in raised position.

The method may include the further steps of selectively removing such pads from adherence to the base section laterally spaced upward facing surfaces; and re-adhering said pads to those surfaces, as in adjusted positions relative to the control 20 and the user's wrists.

Unusual advantages of the invention includes the following:

1. Provision of a pad configured for use as a palm or wrist comfort means, to provide protection from static electricity and heat generated from computer usage to the operators of portable or notebook type computers; the pad including a foam or neoprene material with sticky back for adhesion to a surface of the portable or notebook computer; the pad dimensioned or sized to fit universally onto many brands of portable or notebook computers on the market;

2. Provision of such a pad that defines an ergonomical comfort zone upon which the palm or wrist of the hand may rest while doing work on the portable or notebook computer;

3. Provision of such a pad of thickness, when applied to portable or notebook computer, that is not to exceed height of manufactured portable or notebook computer's built in keys or keyboard;
4. Provision of such a pad of a height not to interfere with nor damage the portable or notebook computer's active matrix or regular screen;
5. Provision of multiple such pads which can be stacked in face to face relation to provide selective cushioning for the computer user's hands, wrists or palms.
6. Provision for adjustable positioning of each of two pads, as by removal and re-attachment in adjusted position, to optimize hand orientation relative to the keyboard, thereby tailoring the position of each pad to the user's left or right hand position, considering that a control or controls must be readily operable between the pads.

I claim:

1. In combination with a computer having a first section supporting a keyboard and a second section supporting a screen, the second section pivotally connected to pivot between upright raised position and a down pivoted position with the second section then overlying the first section and keyboard, the improvement comprising
    a) the first section having two laterally spaced upward facing surfaces offset from the keyboard,
    b) two flat support pads respectively attached to said two spaced surfaces, and openly spaced below the second section in down pivoted position, thereof,
    c) said pads being relatively thin,
    d) said pads sized to comfortably support the computer user's wrists during stroking of the keyboard, when the second section is in raised position,
    e) each pad having thickness between $\frac{1}{32}$ inch and $\frac{3}{16}$ inch throughout the area of the pad,
    f) and each pad consisting of:
        i) an intermediate layer of neoprene foam,
        ii) an upper Nylon layer attached to said intermediate layer, said upper layer having less than half the thickness of the intermediate layer,
        iii) an under layer of adhesive material removably adhesively attaching the pad to one of said first section upward facing surfaces,
        iv) the upper layer and the underlayer each being substantially thinner than the intermediate layer,
        v) the upper layer having thickness between 2.3 mm and 1 mm,
    g) said pads having upper surfaces which are at levels below a plane defined by the uppermost levels of the keyboard keys.

2. The combination of claim 1 wherein the pad is generally rectangular, and has two edges each of about 3.6 inches length, and another two edges each of about 2.5 inches length.

3. The combination of claim 1 including a third support pad adhered in superposed stacked relation to the upper surface of the other of said two support pads.

4. The combination of claim 3 including a fourth support pad adhered in superposed stacked relation to the upper surface of the other of said two support pads.

5. The combination of claim 1 wherein each pad has a slippery upper exposed surface.

6. The method of use of a laptop type computer having a first section supporting a keyboard and a second section supporting a screen, the second section pivotally connected to pivot between upright raised position and a down pivoted position with the second section then overlying the first section and keyboard, the improvement comprising
    a) the first section having two laterally spaced upward facing surfaces offset from the keyboard,
    b) providing two flat support pads respectively attached to said two spaced surfaces, and openly spaced below the second section in down pivoted position thereof,
    c) said pads consisting essentially of elastomeric foam material, and being relatively thin,
    d) said pads sized to support the computer user's wrists during stroking of the keyboard, when the second section is in raised position,
    e) each pad having thickness between $\frac{1}{32}$ inch and $\frac{3}{16}$ inch throughout the area of the pad,
    f) and each pad consisting of:
        i) an intermediate layer of neoprene foam,
        ii) an upper Nylon layer attached to said intermediate layer, said upper layer having less than half the thickness of the intermediate layer,
        iii) an under layer of adhesive material removably adhesively attaching the pad to one of said first section upward facing surfaces,
        iv) the upper layer and the underlayer each being substantially thinner than the intermediate layer,
        v) the upper layer having thickness between 2.3 mm and 1 mm,
    g) said pads having upper surfaces which are at levels below a plane defined by the uppermost levels of the keyboard keys.

7. The method of claim 6 including selectively removing said pads from adherence to said first section laterally spaced upward facing surfaces.

8. The method of claim 7 including re-adhering said pads to said surfaces in adjusted positions, and relative to a computer control between the pads to be operated by one of the hands of the user.

9. The method of claim 6 including providing a third support pad like one of said two pads, and adhesively adhering said third pad in stacked superposed relation to said one pad.

* * * * *